United States Patent
Hashimoto

(10) Patent No.: US 12,240,217 B2
(45) Date of Patent: Mar. 4, 2025

(54) LAMINATED PRODUCT FOR FLEXIBLE PACKAGING, FLEXIBLE PACKAGING MATERIAL, AND FLEXIBLE PACKAGE

(71) Applicant: DOW-MITSUI POLYCHEMICALS CO., LTD., Tokyo (JP)

(72) Inventor: Hidenori Hashimoto, Chiba (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 459 days.

(21) Appl. No.: 17/625,403

(22) PCT Filed: Jul. 2, 2020

(86) PCT No.: PCT/JP2020/025990
§ 371 (c)(1),
(2) Date: Jan. 7, 2022

(87) PCT Pub. No.: WO2021/006172
PCT Pub. Date: Jan. 14, 2021

(65) Prior Publication Data
US 2022/0219873 A1 Jul. 14, 2022

(30) Foreign Application Priority Data
Jul. 9, 2019 (JP) .................................. 2019-127838

(51) Int. Cl.
| | | |
|---|---|---|
| *B32B 7/12* | (2006.01) | |
| *B32B 15/08* | (2006.01) | |
| *B32B 15/12* | (2006.01) | |
| *B32B 15/20* | (2006.01) | |
| *B65D 65/40* | (2006.01) | |

(52) U.S. Cl.
CPC ............... *B32B 7/12* (2013.01); *B32B 15/08* (2013.01); *B32B 15/12* (2013.01); *B32B 15/20* (2013.01); *B65D 65/40* (2013.01); *B32B 2250/03* (2013.01); *B32B 2307/31* (2013.01); *B32B 2307/718* (2013.01); *B32B 2307/7242* (2013.01); *B32B 2307/7265* (2013.01); *B32B 2307/732* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 5,382,472 A | * | 1/1995 | Yanidis ..................... | B32B 7/12 428/347 |
| 2009/0297741 A1 | | 12/2009 | Oshita et al. | |
| 2010/0028649 A1 | | 2/2010 | Trouilhet et al. | |
| 2016/0236452 A1 | | 8/2016 | Caps | |
| 2018/0257341 A1 | | 9/2018 | Salant et al. | |
| 2019/0176455 A1 | * | 6/2019 | Kikuchi ..................... | B32B 7/12 |

FOREIGN PATENT DOCUMENTS

| | | |
|---|---|---|
| CN | 105579800 A | 5/2016 |
| JP | 2001-192018 A | 7/2001 |
| JP | 2004-82510 A | 3/2004 |
| JP | 2007-276194 A | 10/2007 |
| JP | 2008-105302 A | 5/2008 |
| JP | 2011-835 A | 1/2011 |
| JP | 2011000835 A * | 1/2011 |

OTHER PUBLICATIONS

Suzuki, N., Heat Insulating Sheet, Jan. 6, 2011, machine translation of JP2011-000835 (Year: 2011).*
Extended European Search Report (EESR) dated Jul. 13, 2023 for European Patent Application No. 20836513.0.
International Search Report (ISR) dated Sep. 1, 2020 filed in PCT/JP2020/025990.
Chinese Office Action (CNOA) dated Sep. 26, 2024 issued for Chinese patent application No. 202080049233.4.

* cited by examiner

*Primary Examiner* — Chinessa T. Golden
(74) *Attorney, Agent, or Firm* — RANKIN, HILL & CLARK LLP

(57) ABSTRACT

A laminated product for flexible packaging is provided, in which at least a paper substrate layer, an adhesive layer, a barrier layer, and a sealant layer are laminated in this order, the adhesive layer contains an ionomer (A) of an ethylene-unsaturated carboxylic acid copolymer, and a content of metal ions represented by X×Y/100 is equal to or more than 4.0 and equal to or less than 20.0 when a content of unsaturated carboxylic acid in an ethylene-unsaturated carboxylic acid copolymer (A1) constituting the ionomer (A) of the ethylene-unsaturated carboxylic acid copolymer is X [mass %], and a degree of neutralization of the ionomer (A) of the ethylene-unsaturated carboxylic acid copolymer is Y [mol %].

11 Claims, No Drawings

LAMINATED PRODUCT FOR FLEXIBLE PACKAGING, FLEXIBLE PACKAGING MATERIAL, AND FLEXIBLE PACKAGE

TECHNICAL FIELD

The present invention relates to a laminated product for flexible packaging, a flexible packaging material, and a flexible package.

BACKGROUND ART

Conventionally, most flexible packaging materials for packaging foods, pharmaceuticals, cosmetics, hygiene products, agricultural chemicals, seeds, electronic components, electronic devices, and the like are manufactured by laminating various barrier layers, sealant layers, and the like on a plastic substrate.

In recent years, environmental destruction caused by plastic waste has become a global problem, and packaging materials that reduce the environmental burden have been attracting attention in response to the growing momentum for environmental consideration and promotion of resource conservation. Among them, also in the field of flexible packaging, it is thought that a reduction in amount of plastic used can be achieved by changing a plastic substrate to a structure in which "paper" which is one of the biomass materials is used.

Meanwhile, cellulose-derived paper has many spaces and is inferior compared to plastic in terms of various physical properties, particularly water resistance, puncture strength, and gas barrier properties, which is a problem.

Examples of techniques relating to packaging materials in which a paper substrate is used include those disclosed in Patent Document 1 (Japanese Unexamined Patent Publication No. 2007-276194) and Patent Document 2 (Japanese Unexamined Patent Publication No. 2004-82510).

Patent Document 1 discloses a laminated product characterized in that a printing layer is provided on one surface of a paper substrate with an aqueous ink, and on the opposite surface of the printing layer, a sealant layer, which is formed into a film by blending a polyolefin resin and a compatibilizing agent with a polyester resin or a polyamide resin and kneading and extruding, is extruded and laminated.

Patent Document 2 discloses a packaging material which is constituted of a paper layer, an aluminum foil layer, and a sealant layer and is characterized in that a resin layer made of a polyethylene terephthalate film is laminated between the layers of the paper layer and the aluminum foil layer.

RELATED DOCUMENT

Patent Document

[Patent Document 1] Japanese Unexamined Patent Publication No. 2007-276194
[Patent Document 2] Japanese Unexamined Patent Publication No. 2004-82510

SUMMARY OF THE INVENTION

Technical Problem

However, the conventional packaging material in which a paper substrate is used has room for improvement in pinhole resistance caused by bending from the viewpoint of protecting the contents, for example.

The present invention has been made in view of the above-mentioned circumstances, and provides a laminated product for flexible packaging capable of obtaining a flexible packaging material having excellent pinhole resistance with a paper substrate which is a biomass material as a base.

Solution to Problem

The inventors of the present invention have repeated diligent studies to achieve the above-mentioned object. As a result, they have found that a laminated product capable of obtaining a flexible packaging material having excellent pinhole resistance can be obtained by forming an adhesive layer containing an ionomer of an ethylene-unsaturated carboxylic acid copolymer in which the content of metal ions is in a specific range between a paper substrate layer and a barrier layer, and have completed the present invention.

That is, according to the present invention, the following laminated product for flexible packaging, flexible packaging material, and flexible package are provided.

[1]

A laminated product for flexible packaging, in which at least a paper substrate layer, an adhesive layer, a barrier layer, and a sealant layer are laminated in this order, the adhesive layer contains an ionomer (A) of an ethylene-unsaturated carboxylic acid copolymer, and a content of metal ions represented by X×Y/100 is equal to or more than 4.0 and equal to or less than 20.0 when a content of unsaturated carboxylic acid in an ethylene-unsaturated carboxylic acid copolymer (A1) constituting the ionomer (A) of the ethylene-unsaturated carboxylic acid copolymer is X [mass %], and a degree of neutralization of the ionomer (A) of the ethylene-unsaturated carboxylic acid copolymer is Y [mol %].

[2]

The laminated product for flexible packaging according to [1], in which a melt flow rate (MFR) of the ionomer (A) of the ethylene-unsaturated carboxylic acid copolymer measured under conditions of 190° C. and a load of 2160 g according to JIS K 7210:1999 is equal to or more than 0.1 g/10 minutes and equal to or less than 10 g/10 minutes.

[3]

The laminated product for flexible packaging according to [1] or [2], in which a thickness of the adhesive layer is equal to or more than 5 μm.

[4]

The lamination film according to any one of [1] to [3], in which the adhesive layer is an extrusion coating processed layer.

[5]

The laminated product for flexible packaging according to any one of [1] to [4], in which unsaturated carboxylic acid constituting the ethylene-unsaturated carboxylic acid copolymer (A1) includes at least one selected from acrylic acid and methacrylic acid.

[6]

The laminated product for flexible packaging according to any one of [1] to [5], in which metal ions constituting the ionomer (A) of the ethylene-unsaturated carboxylic acid copolymer include at least one selected from sodium ions and zinc ions.

[7]

The laminated product for flexible packaging according to any one of [1] to [6], in which a basis weight of paper constituting the paper substrate layer is equal to or less than 225 g/m².

[8]

The laminated product for flexible packaging according to any one of [1] to [7], in which the barrier layer contains metallic foil.

[9]

The laminated product for flexible packaging according to any one of [1] to [8], in which the sealant layer contains at least one selected from an ethylene-unsaturated carboxylic acid copolymer and an ionomer of an ethylene-unsaturated carboxylic acid copolymer.

[10]

A flexible packaging material including at least a layer formed from the laminated product according to any one of [1] to [9]

[11]

A flexible package including: the flexible packaging material according to [10]; and an article packaged by the flexible packaging material.

Advantageous Effects of Invention

According to the present invention, it is possible to provide a laminated product for flexible packaging capable of obtaining a flexible packaging material having excellent pinhole resistance with a paper substrate which is a biomass material as a base.

DESCRIPTION OF EMBODIMENTS

Hereinafter, embodiments of the present invention will be described in detail. In the present embodiment, the notation "a to b" in the description of a numerical value range indicates that it is equal to or more than a and equal to or less than b unless otherwise specified. Furthermore, in the present embodiment, "(meth)acrylic" means acrylic, methacrylic, or both acrylic and methacrylic.

1. Laminated Product for Flexible Packaging

In a laminated product for flexible packaging according to the present embodiment, at least a paper substrate layer, an adhesive layer, a barrier layer, and a sealant layer are laminated in this order, the adhesive layer contains an ionomer (A) of an ethylene-unsaturated carboxylic acid copolymer, and a content of metal ions represented by X×Y/100 is equal to or more than 4.0 and equal to or less than 20.0 when a content of unsaturated carboxylic acid in an ethylene-unsaturated carboxylic acid copolymer (A1) constituting the ionomer (A) of the ethylene-unsaturated carboxylic acid copolymer is X [mass %], and a degree of neutralization of the ionomer (A) of the ethylene-unsaturated carboxylic acid copolymer is Y [mol %].

With the above-mentioned layer structure, the laminated product for flexible packaging according to the present embodiment can be a laminated product having favorable pinhole resistance.

Hereinafter, each of the layers constituting the laminated product for flexible packaging according to the present embodiment will be described.

<Paper Substrate Layer>

As the paper substrate layer, paper having the basis weight of equal to or less than 225 g/m² is preferable on the premise of use for flexible packaging, and from the viewpoint of bag-making processability into a flexible packaging form and puncture strength, paper having the basis weight of equal to or less than 180 g/m² is more preferable, and paper having the basis weight of 20 to 80 g/m² is particularly preferable. As such a paper substrate layer, for example, it is possible to suitably use high-quality paper, pure white roll paper, coated paper, single-sided art paper, double-sided art paper, mixed paper, and the like, but examples are not limited thereto. Furthermore, a printing layer can be provided on the outer surface of the paper substrate layer as necessary.

Furthermore, in order to increase the adhesion strength, the paper substrate layer may be subjected to physical treatment such as corona treatment, plasma treatment, flame treatment, and ozone treatment, and chemical treatment such as anchor coating treatment.

Furthermore, for paper, from the viewpoint of imparting flexibility and appropriate rigidity as a flexible packaging material, the rigidity measured by a loop stiffness method is preferably equal to or more than 10 mN and equal to or less than 1000 mN and is more preferably equal to or more than 10 mN and equal to or less than 200 mN in both of an MD direction or a TD direction. The rigidity measured by the loop stiffness method can be measured under conditions of a span (loop length) of 100 mm, a width of 25 mm, a compression distance of 15 mm, and a compression rate of 3.3 mm/sec using a "Loop Stiffness Tester" manufactured by Toyo Seiki Seisaku-sho, Ltd., for example.

The thickness of the paper substrate layer is equal to or more than 30 μm and equal to or less than 400 μm, for example. From the viewpoint of imparting flexibility and appropriate rigidity as a flexible packaging material, the thickness is preferably equal to or more than 30 μm and equal to or less than 200 μm, is more preferably equal to or more than 30 μm and less than 150 μm, and is particularly preferably equal to or more than 30 μm and equal to or less than 100 μm.

<Adhesive Layer>

The adhesive layer according to the present embodiment contains the ionomer (A) of the ethylene-unsaturated carboxylic acid copolymer.

The content of the ionomer (A) of the ethylene-unsaturated carboxylic acid copolymer in the adhesive layer is preferably equal to or more than 70% by mass, is more preferably equal to or more than 80% by mass, is further preferably equal to or more than 90% by mass, and is particularly preferably equal to or more than 95% by mass when the entire adhesive layer is 100% by mass from the viewpoint of adhesiveness. The upper limit of the content of the ionomer (A) of the ethylene-unsaturated carboxylic acid copolymer is not particularly limited, but is equal to or less than 100% by mass, for example.

In the ionomer (A) of the ethylene-unsaturated carboxylic acid copolymer, the content of metal ions, which is represented by X×Y/100 using the content of unsaturated carboxylic acid (X: mass %) and the degree of neutralization of metal (Y: mol %), is equal to or more than 4.0 and equal to or less than 20.0, but is preferably equal to or more than 6.0 from the viewpoint of further improving pinhole resistance, and is preferably equal to or less than 18.0, is more preferably equal to or less than 15.0, is further preferably equal to or less than 12.0, and is particularly preferably equal to or less than 10.0 from the viewpoint of improving film forming properties.

The thickness of the adhesive layer is equal to or more than 1 μm and equal to or less than 100 μm, is preferably equal to or more than 3 μm and equal to or less than 80 μm, and is more preferably equal to or more than 5 μm and equal to or less than 40 μm, for example.

Furthermore, from the viewpoint of improving extrusion coating properties of the adhesive layer, the thickness of the adhesive layer is preferably equal to or more than 5 μm, and is more preferably equal to or more than 10 μm. From the viewpoint of improving film forming processability, the thickness of the adhesive layer is preferably equal to or less than 40 μm, is more preferably equal to or less than 30 μm, and is further preferably equal to or less than 25 μm.

The ethylene-unsaturated carboxylic acid copolymer (A1) that is a base resin of the ionomer (A) of the ethylene-unsaturated carboxylic acid copolymer is a polymer obtained by copolymerizing at least ethylene and a monomer selected from unsaturated carboxylic acids as copolymerization components, and as necessary, ethylene and a monomer other than unsaturated carboxylic acid-based monomers may be copolymerized.

The copolymer may be any of a block copolymer, a random copolymer, or a graft copolymer, but in consideration of productivity, it is preferable to use a binary random copolymer, a ternary random copolymer, a graft copolymer of a binary random copolymer, or a graft copolymer of a ternary random copolymer, and a binary random copolymer or a ternary random copolymer is more preferable.

As the ethylene-unsaturated carboxylic acid copolymer (A1), at least one selected from the group consisting of an ethylene-unsaturated carboxylic acid binary copolymer and an ethylene-unsaturated carboxylic acid alkyl ester-unsaturated carboxylic acid ternary copolymer is preferable.

Examples of the unsaturated carboxylic acid include unsaturated carboxylic acids having 4 to 8 carbon atoms such as acrylic acid, methacrylic acid, ethacrylic acid, itaconic acid, itaconic anhydride, fumaric acid, crotonic acid, maleic acid, maleic anhydride, monoester maleate (monomethyl maleate, monoethyl maleate, and the like), and maleic anhydride monoester (maleic anhydride monomethyl, maleic anhydride monoethyl, and the like) or half esters.

Among these, the unsaturated carboxylic acid preferably includes at least one selected from acrylic acid and methacrylic acid from the viewpoint of productivity of the ethylene-unsaturated carboxylic acid copolymer (A1), and the like. For these unsaturated carboxylic acids, one kind may be used alone or two or more kinds may be used in combination.

The ethylene-unsaturated carboxylic acid copolymer (A1) is a copolymer obtained by copolymerizing at least ethylene and an unsaturated carboxylic acid, and may be a polynary copolymer, which is equal to or higher than a ternary copolymer, obtained by further copolymerizing a third copolymerization component.

In a polynary copolymer, in addition to ethylene and (meth)acrylic acid copolymerizable with the ethylene, as a third copolymerization component, unsaturated carboxylic acid esters (for example, (meth)acrylic acid alkyl esters such as methyl acrylate, ethyl acrylate, isobutyl acrylate, n-butyl acrylate, isooctyl acrylate, methyl methacrylate, ethyl methacrylate, isobutyl methacrylate, dimethyl maleate, and diethyl maleate), vinyl esters (for example, vinyl acetate and vinyl propionate), unsaturated hydrocarbons (for example, propylene, butene, 1,3-butadiene, pentene, 1,3-pentadiene, and 1-hexene), oxides such as vinyl sulfate and vinyl nitrate, halogen compounds (for example, vinyl chloride and vinyl fluoride), vinyl group-containing primary and secondary amine compounds, carbon monoxide, sulfur dioxide, and the like may be copolymerized.

Among these, as the third copolymerization component, unsaturated carboxylic acid esters are preferable, and (meth)acrylic acid alkyl esters (where a preferable number of carbon atoms of the alkyl moiety is 1 to 4) are more preferable.

The content ratio of a structural unit derived from the third copolymerization component in an ethylene-(meth)acrylic acid-based copolymer is preferably in the range of equal to or less than 25% by mass.

When the content ratio of the structural unit derived from the third copolymerization component is equal to or less than the above-mentioned upper limit value, it is preferable from the viewpoint of production and mixing.

In the ethylene-unsaturated carboxylic acid copolymer (A1) according to the present embodiment, the content of a structural unit derived from ethylene is preferably equal to or more than 65% by mass and equal to or less than 95% by mass, is more preferably equal to or more than 75% by mass and equal to or less than 93% by mass, and is further preferably equal to or more than 80% by mass and equal to or less than 92% by mass.

In the ethylene-unsaturated carboxylic acid copolymer (A1) according to the present embodiment, the content (that is, the content X of unsaturated carboxylic acid) of a structural unit derived from unsaturated carboxylic acid is preferably equal to or more than 5% by mass and equal to or less than 35% by mass, is more preferably equal to or more than 7% by mass and equal to or less than 25% by mass, and is further preferably equal to or more than 8% by mass and equal to or less than 20% by mass.

The content (X) of unsaturated carboxylic acid in the ethylene-unsaturated carboxylic acid copolymer (A1) can be measured by Fourier transform infrared absorption spectroscopy (FT-IR), for example.

Examples of the metal ions constituting the ionomer (A) of the ethylene-unsaturated carboxylic acid copolymer according to the present embodiment include alkali metal ions such as lithium ion, potassium ion, and sodium ion; and polyvalent metal ions such as calcium ion, magnesium ion, zinc ion, aluminum ion, and barium ion. For these metal ions, one kind may be used alone or two or more kinds may be used in combination.

Among these, it is preferable to contain at least one selected from sodium ion and zinc ion, and it is more preferable to contain zinc ion.

The degree of neutralization of the ionomer (A) of the ethylene-unsaturated carboxylic acid copolymer according to the present embodiment is not particularly limited, but is preferably equal to or less than 95 mol %, is more preferably equal to or less than 90 mol %, is further preferably equal to or less than 85 mol %, and is particularly preferably equal to or less than 80 mol % from the viewpoint of further improving processability.

Furthermore, the degree of neutralization of the ionomer (A) of the ethylene-unsaturated carboxylic acid copolymer according to the present embodiment is not particularly limited, but is preferably equal to or more than 5 mol %, is more preferably equal to or more than 10 mol %, is further preferably equal to or more than 15 mol %, and is particularly preferably equal to or more than 20 mol % from the viewpoint of further improving processing adequacy when laminating the laminated product.

The degree of neutralization of the ionomer (A) of the ethylene-unsaturated carboxylic acid copolymer can be measured by an incineration residue analysis method, for example.

A method for manufacturing the ionomer (A) of the ethylene-unsaturated carboxylic acid copolymer is not particularly limited, and manufacturing can be performed by a known method. Furthermore, as the ionomer (A) of the ethylene-unsaturated carboxylic acid copolymer, a commercially available one may be used.

In the present embodiment, the melt flow rate (MFR) of the ionomer (A) of the ethylene-unsaturated carboxylic acid copolymer measured under conditions of 190° C. and the load of 2160 g according to JIS K 7210:1999 is preferably equal to or more than 0.1 g/10 minutes and equal to or less than 10 g/10 minutes. When the MFR is in the above-mentioned range, the interlayer adhesiveness between the paper substrate layer and the adhesive layer, and the interlayer adhesiveness between the barrier layer to be described later and the adhesive layer are further improved.

The MFR of the ionomer described in Examples to be described later is a value measured under the above-mentioned conditions.

The adhesive layer can contain components other than the ionomer (A) of the ethylene-unsaturated carboxylic acid copolymer as long as the object of the present invention is not impaired. The other components are not particularly limited, but examples thereof include plasticizers, antioxidants, ultraviolet absorbers, antistatic agents, surfactants, colorants, light stabilizers, foaming agents, lubricants, crystal nucleating agents, crystallization accelerators, crystallization retarders, catalytic deactivators, thermoplastic resins other than the ionomer (A) of the ethylene-unsaturated carboxylic acid copolymer, thermosetting resins, inorganic fillers, organic fillers, impact resistance improvers, slip agents, cross-linking agents, cross-linking aids, viscosity imparting agents, silane coupling agents, processing aids, release agents, hydrolysis inhibitors, heat-resistant stabilizers, anti-blocking agents, anti-fog agents, flame retardants, flame retardant aids, light diffusing agents, antibacterial agents, antifungal agents, dispersants, and other resins. For the other components, one kind may be used alone or two or more kinds may be used in combination.

<Barrier Layer>

The barrier layer is a layer that is provided to impart gas barrier properties and water vapor barrier properties and further block the odor from the outside air so as not to transfer the odor to the contents of a package formed by using the laminated product for flexible packaging which will be described later. It is possible to preferably use uniaxially stretched or biaxially stretched polyethylene terephthalate (PET) films; stretching films such as polyamide films and polyolefin; or inorganic compound vapor-deposited plastic films, metallic foil (copper foil, aluminum foil, and the like), ethylene vinyl alcohol copolymer resin films, vinylidene chloride films, polyvinyl alcohol films, and the like, which are obtained by providing, on the stretching film, thin films of inorganic substances such as aluminum and inorganic compounds such as aluminum oxide and silicon oxide by a thickness of about 20 to 100 nm by a vapor deposition method such as physical vapor deposition or chemical vapor deposition. These may be laminated and used as necessary. Among these, metallic foil (copper foil, aluminum foil, and the like) is preferable, and aluminum foil is more preferable, because they are excellent in mechanical strength, barrier properties, and the like.

The thickness of the barrier layer is equal to or more than 5 μm and equal to or less than 100 μm, for example.

In the barrier layer, the surface on the side to be adhered to (or laminated with) the adhesive layer may be subjected to physical treatment such as corona treatment, plasma treatment, flame treatment, and ozone treatment in order to increase the adhesion strength with respect to the adhesive layer. Furthermore, the barrier layer may be subjected to a known anchor coating treatment.

<Sealant Layer>

The laminated product for flexible packaging according to the present embodiment includes the sealant layer in order to impart heat-sealing properties.

The sealant layer is provided on the surface of the barrier layer on the opposite side to the surface on which the adhesive layer is provided.

The sealant layer is a layer for imparting heat-sealing properties to the laminated product for flexible packaging according to the present embodiment, and includes a thermoplastic resin (C1), for example.

The thickness of the sealant layer is equal to or more than 1 μm and equal to or less than 300 μm, is preferably equal to or more than 5 μm and equal to or less than 200 μm, and is more preferably equal to or more than 10 μm and equal to or less than 150 μm, for example.

Examples of the thermoplastic resin (C1) according to the present embodiment include polyethylene such as high-density polyethylene, high-pressure method low-density polyethylene, low-density polyethylene (LDPE), and linear low-density polyethylene (LLDPE), ethylene-unsaturated carboxylic acid copolymers or ionomers thereof, ethylene-vinyl acetate copolymers (EVA), ethylene-α-olefin copolymer elastomers, polypropylene, propylene-based copolymers (copolymers of propylene and α-olefin other than propylene), polybutene and other olefinic (co)polymers, and polyolefins such as these polymer blends. Examples of the α-olefin include propylene, 1-butene, 1-pentene, 1-hexene, 1-octene, 1-decene, 1-dodecene, and 4-methyl-1-pentene.

Among these, from the viewpoint of excellent pinhole resistance, as the thermoplastic resin (C1), it is preferable to contain at least one selected from ethylene-unsaturated carboxylic acid copolymers and ionomers of ethylene-unsaturated carboxylic acid copolymers, and it is more preferable to contain ionomers of ethylene-unsaturated carboxylic acid copolymers.

The content of the thermoplastic resin (C1) in the sealant layer according to the present embodiment is preferably equal to or more than 50% by mass and equal to or less than 100% by mass, is more preferably equal to or more than 70% by mass and equal to or less than 100% by mass, is further preferably equal to or more than 90% by mass and equal to or less than 100% by mass, and is particularly preferably equal to or more than 95% by mass and equal to or less than 100% by mass when the entire sealant layer is 100% by mass. Accordingly, it is possible to improve the balance between the adhesiveness with respect to the barrier layer and the heat-sealing properties.

The sealant layer according to the present embodiment may contain components other than the thermoplastic resin (C1) as long as the object of the present invention is not impaired. The other components are not particularly limited, but examples thereof include plasticizers, antioxidants, ultraviolet absorbers, antistatic agents, surfactants, colorants, light stabilizers, foaming agents, lubricants, crystal nucleating agents, crystallization accelerators, crystallization retarders, catalytic deactivators, thermoplastic resins other than the thermoplastic resin (C1), thermosetting resins, inorganic fillers, organic fillers, impact resistance improvers, slip agents, cross-linking agents, cross-linking aids, viscosity imparting agents, silane coupling agents, processing aids, release agents, hydrolysis inhibitors, heat-resistant stabilizers, anti-blocking agents, anti-fog agents, flame retardants, flame retardant aids, light diffusing agents, antibacterial agents, antifungal agents, dispersants, and other resins. For the other components, one kind may be used alone or two or more kinds may be used in combination.

<Other Layers>

The laminated product for flexible packaging according to the present embodiment may be constituted of only four layers of the paper substrate layer, the adhesive layer, the barrier layer, and the sealant layer, and or may include layers (hereinafter, also referred to as other layers) other than the above-mentioned four layers from the viewpoint of imparting various functions to the laminated product for flexible packaging.

Examples of the other layers include a foaming layer, an inorganic substance layer, a hard coat layer, an antireflection layer, an antifouling layer, and an anchor coat layer. For the other layers, one layer may be used alone or two or more layers may be used in combination.

<Usage Applications>

The laminated product for flexible packaging according to the present embodiment can be suitably used as a packaging material used for packaging foods, pharmaceuticals, industrial products, daily necessities, cosmetics, and the like.

2. Method for Manufacturing Laminated Product for Flexible Packaging

A method for manufacturing the laminated product for flexible packaging according to the present embodiment preferably include an extrusion step of extrusion coating the paper substrate layer with a resin composition containing the ionomer (A) of the ethylene-unsaturated carboxylic acid copolymer to form the adhesive layer on the paper substrate layer. That is, the adhesive layer of the laminated product for flexible packaging according to the present embodiment is preferably an extrusion coating processed layer formed by an extrusion coating method.

When the extrusion coating method is used, the resin temperature at the time of processing can be raised as compared with other film forming methods, and it becomes possible to coat the paper substrate layer with the resin composition containing the ionomer (A) of the ethylene-unsaturated carboxylic acid copolymer in a molten state.

That is, according to the method for manufacturing the laminated product for flexible packaging according to the present embodiment, the adhesive layer can be accurately and stably formed on the paper substrate layer.

A processing apparatus and processing conditions in the extrusion step are not particularly limited, and conventionally known processing apparatus and processing conditions can be adopted. As the processing apparatus, a T-die extruder or the like can be used. Furthermore, as the processing conditions, the processing conditions of a known extrusion coating method can be adopted.

In the method for manufacturing the laminated product for flexible packaging according to the present embodiment, the extrusion coating temperature in the extrusion step is not particularly limited because it is appropriately set depending on the type and composition of the ionomer (A) of the ethylene-unsaturated carboxylic acid copolymer, but from the viewpoint of improving film-forming properties, the temperature is preferably equal to or higher than 200° C., is more preferably equal to or higher than 250° C., and is particularly preferably equal to or higher than 280° C.

The upper limit of the extrusion coating temperature in the extrusion step is not particularly limited but is equal to or lower than 350° C., for example.

3. Flexible Packaging Material

A flexible packaging material according to the present embodiment includes at least a layer constituted of the laminated product for flexible packaging according to the present embodiment. Furthermore, the laminated product for flexible packaging according to the present embodiment may be used in a part of the flexible packaging material according to the present embodiment, or the laminated product for flexible packaging according to the present embodiment may be used in the entire flexible packaging material.

The shape of the flexible packaging material according to the present embodiment is not particularly limited, and examples thereof include a sheet shape, a film shape, and a bag shape.

The bag-shaped form is not particularly limited, and examples thereof include a three-sided bag, a four-sided bag, a pillow bag, a gusset bag, and a stick bag.

The flexible packaging material according to the present embodiment can be suitably used as a packaging material used for packaging foods, pharmaceuticals, industrial products, daily necessities, cosmetics, and the like.

4. Flexible Package

A flexible package according to the present embodiment includes the flexible packaging material according to the present embodiment, and an article packaged by the flexible packaging material. The flexible packaging material according to the present embodiment has an article protection function.

Examples of the above-mentioned article include foods, pharmaceuticals, industrial products, daily necessities, and cosmetics.

Although the embodiments of the present invention have been described above, these are examples of the present invention, and various configurations other than the above can be adopted.

EXAMPLES

Hereinafter, the present invention will be described with reference to examples and comparative examples, but the present invention is not limited thereto.

The details of materials used for producing a lamination film are as follows.

<Paper Substrate Layer>

Single-sided art paper (79 g/m$^2$, manufactured by Mitsubishi Paper Mills Limited)

Regarding this paper, the rigidity measured under conditions of a span (loop length) of 100 mm, a width of 25 mm, a compression distance of 15 mm, and a compression rate of 3.3 mm/sec by a loop stiffness method using (a "Loop Stiffness Tester" manufactured by Toyo Seiki Seisaku-sho, Ltd. was 114 mN (MD direction).

<Adhesive Layer>

(Ionomer (A) of Ethylene-Unsaturated Carboxylic Acid Copolymer)

IO-1: Ionomer of ethylene-methacrylic acid copolymer (content of metal ions: 3.2, metal ion: zinc, MFR: 16 g/10 minutes)

IO-2: Ionomer of ethylene-methacrylic acid copolymer (content of metal ions: 3.5, metal ion: zinc, MFR: 5.0 g/10 minutes)

IO-3: Ionomer of ethylene-methacrylic acid copolymer (content of metal ions: 7.2, metal ion: zinc, MFR: 5.5 g/10 minutes)

IO-4: Ionomer of ethylene-methacrylic acid copolymer (content of metal ions: 7.3, metal ion: zinc, MFR: 1.0 g/10 minutes)

IO-5: Ionomer of ethylene-methacrylic acid-isobutyl acrylate copolymer (content of metal ions: 7.0, metal ion: zinc, MFR: 1.1 g/10 minutes)

IO-6: Ionomer of ethylene-methacrylic acid copolymer (content of metal ions: 8.9, metal ion: zinc, MFR: 0.9 g/10 minutes)

IO-7: Ionomer of ethylene-methacrylic acid copolymer (content of metal ions: 3.5, metal ion: sodium, MFR: 2.8 g/10 minutes)

IO-8: Ionomer of ethylene-methacrylic acid copolymer (content of metal ions: 4.5, metal ion: sodium, MFR: 2.8 g/10 minutes)

IO-9: Ionomer of ethylene-methacrylic acid copolymer (content of metal ions: 6.3, metal ion: sodium, MFR: 2.2 g/10 minutes)

IO-10: Ionomer of ethylene-methacrylic acid copolymer (content of metal ions: 8.1, metal ion: sodium, MFR: 0.9 g/10 minutes)

In any of IO-1 to IO-10, the content of a structural unit derived from unsaturated carboxylic acid (that is, the content X of unsaturated carboxylic acid) is equal to or more than 8% by mass and equal to or less than 20% by mass.

(Low-Density Polyethylene)

LDPE1 (low-density polyethylene, MFR: 7.2 g/10 minutes, density 917 kg/m$^3$)

LDPE2 (low-density polyethylene, MFR: 1.6 g/10 minutes, density 920 kg/m$^3$)

(Ethylene-Methacrylic Acid Copolymer)

EMAA1: Ethylene-methacrylic acid copolymer (content of ethylene: 91% by mass, content of methacrylic acid: 9% by mass, MFR: 8.0 g/10 minutes)

<Barrier Layer>

Al foil: Aluminum foil (manufactured by Toyo Aluminium K.K., 1N30, thickness 7 μm)

<Sealant Layer>

EMAA2: Ethylene-methacrylic acid copolymer (content of ethylene: 89% by mass, content of methacrylic acid: 11% by mass, MFR: 8 g/10 minutes)

IO-5: Ionomer of ethylene-methacrylic acid-isobutyl acrylate copolymer (content of metal ions: 7.0, metal ion: zinc, MFR: 1.1 g/10 minutes)

Examples 1 to 7 and Comparative Examples 1 to 6

Using an extrusion laminator having a 65 mmΦ extruder (L/D=28), a paper substrate layer was subjected to in-line corona treatment under the processing conditions of the temperature under a die of 300° C., the air gap of 110 mm, and the processing rate of 80 m/min, and thereafter, an ionomer (A) of an ethylene-unsaturated carboxylic acid copolymer, low-density polyethylene, or an ethylene-unsaturated carboxylic acid copolymer was extrusion coated between the paper substrate layer and a barrier layer to obtain a laminated product in which the paper substrate layer, an adhesive layer, and the barrier layer were laminated in this order.

Furthermore, using an extrusion laminator having a 65 mmΦ extruder (L/D=28), under the processing conditions of the temperature under a die of 285° C., the air gap of 110 mm, and the processing rate of 80 m/min, the ethylene-unsaturated carboxylic acid copolymer or the ionomer of the ethylene-unsaturated carboxylic acid copolymer used for the sealant layer was extrusion coated on Al foil of the laminated product obtained above to obtain a laminated product shown in Table 1. However, the temperature under the die at the time of extruding the ionomer of the ethylene-unsaturated carboxylic acid copolymer was set to 300° C.

The following evaluation was performed on each of the obtained laminated products. Each of the obtained results is shown in Table 1.

<Pinhole Resistance Evaluation>

After adjusting the humidity of the laminated product obtained above under the conditions of 23° C. and 50% RH, evaluation of pinhole resistance was performed using a gelboflex tester manufactured by Toyo Seiki Seisaku-sho, Ltd. (based on the MIL-B-131C standard). Specifically, first, a rectangular test film, which was sampled in the A4 (297 mm×210 mm) size with the machine direction (MD) of the laminated product as the long side, was formed into a cylinder having the length of 210 mm with the sealant layer on the inner side. 50 times of reciprocating motion was applied to the cylinder at a speed of 40 times/minute. The reciprocating motion consists of shrinking the cylinder by 90 mm while adding a twist of an angle of 440 degrees, shrinking the twisted cylinder by 64 mm, and then undo the cylinder. Thereafter, the number of pinholes was counted. This measurement was performed twice, and evaluation was performed using the average value thereof.

TABLE 1

| | Paper substrate layer | Adhesive layer | | | | | Sealant Layer | | Pinhole resistance |
| | | Type of resin | Content of metal ions | Type of metal ions | MFR g/10 min | Thickness μm | Barrier layer | Type of resin | Thickness [μm] | Number of pinholes |
|---|---|---|---|---|---|---|---|---|---|---|
| Example 1 | Single-sided art paper | IO-3 | 7.2 | Zn | 5.5 | 16 | Al foil | EMAA2 | 20 | 23 |
| Example 2 | Single-sided art paper | IO-4 | 7.3 | Zn | 1.0 | 13 | Al foil | EMAA2 | 20 | 3 |
| Example 3 | Single-sided art paper | IO-5 | 7.0 | Zn | 1.1 | 15 | Al foil | EMAA2 | 20 | 2 |
| Example 4 | Single-sided art paper | IO-6 | 8.9 | Zn | 0.9 | 15 | Al foil | EMAA2 | 20 | 12 |
| Example 5 | Single-sided art paper | IO-8 | 4.5 | Na | 2.8 | 13 | Al foil | EMAA2 | 20 | 27 |
| Example 6 | Single-sided art paper | IO-9 | 6.3 | Na | 2.2 | 15 | Al foil | EMAA2 | 20 | 26 |
| Example 7 | Single-sided art paper | IO-10 | 8.1 | Na | 0.9 | 16 | Al foil | EMAA2 | 20 | 22 |

TABLE 1-continued

|  | Paper substrate layer | Adhesive layer | | | | | | Sealant Layer | | Pinhole resistance |
|---|---|---|---|---|---|---|---|---|---|---|
|  |  | Type of resin | Content of metal ions | Type of metal ions | MER g/10 min | Thickness μm | Barrier layer | Type of resin | Thickness [μm] | Number of pinholes |
| Example 8 | Single-sided art paper | IO-5 | 7.0 | Zn | 1.1 | 15 | Al foil | IO-5 | 20 | 0 |
| Comparative Example 1 | Single-sided art paper | LDPE1 | — | — | 7.2 | 16 | Al foil | EMAA2 | 20 | 49 |
| Comparative Example 2 | Single-sided art paper | LDPE2 | — | — | 1.6 | 15 | Al foil | EMAA2 | 20 | 46 |
| Comparative Example 3 | Single-sided art paper | EMAA1 | — | — | 8.0 | 16 | Al foil | EMAA2 | 20 | 40 |
| Comparative Example 4 | Single-sided art paper | IO-1 | 3.2 | Zn | 16 | 13 | Al foil | EMAA2 | 20 | 38 |
| Comparative Example 5 | Single-sided art paper | IO-2 | 3.5 | Zn | 5.0 | 15 | Al foil | EMAA2 | 20 | 48 |
| Comparative Example 6 | Single-sided art paper | IO-7 | 3.5 | Zn | 2.8 | 16 | Al foil | EMAA2 | 20 | 47 |

This application claims priority on the basis of Japanese Patent Application No. 2019-127838 filed on Jul. 9, 2019, and incorporates all of its disclosures herein.

The invention claimed is:

1. A laminated product for flexible packaging,
wherein at least a paper substrate layer, an adhesive layer, a barrier layer, and a sealant layer are laminated in this order,
the adhesive layer contains an ionomer (A) of an ethylene-unsaturated carboxylic acid copolymer,
a content of metal ions represented by X×Y/100 is equal to or more than 4.0 and equal to or less than 20.0 when a content of unsaturated carboxylic acid in an ethylene-unsaturated carboxylic acid copolymer (A1) constituting the ionomer (A) of the ethylene-unsaturated carboxylic acid copolymer is X [mass %], and a degree of neutralization of the ionomer (A) of the ethylene-unsaturated carboxylic acid copolymer is Y [mol %],
a paper constituting the paper substrate layer has a basis weight of equal to or less than 180 g/m$^2$, and
the adhesive layer is constituted of one layer.

2. The laminated product for flexible packaging according to claim 1,
wherein a melt flow rate (MFR) of the ionomer (A) of the ethylene-unsaturated carboxylic acid copolymer measured under conditions of 190° C. and a load of 2160 g according to JIS K 7210:1999 is equal to or more than 0.1 g/10 minutes and equal to or less than 10 g/10 minutes.

3. The laminated product for flexible packaging according to claim 1,
wherein a thickness of the adhesive layer is equal to or more than 5 μm.

4. The laminated product according to claim 1,
wherein the adhesive layer is an extrusion coating processed layer.

5. The laminated product for flexible packaging according to claim 1,
wherein unsaturated carboxylic acid constituting the ethylene-unsaturated carboxylic acid copolymer (A1) includes at least one selected from acrylic acid and methacrylic acid.

6. The laminated product for flexible packaging according to claim 1,
wherein metal ions constituting the ionomer (A) of the ethylene-unsaturated carboxylic acid copolymer include at least one selected from sodium ions and zinc ions.

7. The laminated product for flexible packaging according to claim 1,
wherein the barrier layer contains metallic foil.

8. The laminated product for flexible packaging according to claim 1,
wherein the sealant layer contains at least one selected from an ethylene-unsaturated carboxylic acid copolymer and an ionomer of an ethylene-unsaturated carboxylic acid copolymer.

9. A flexible packaging material comprising at least a layer formed from the laminated product according to claim 1.

10. A flexible package comprising:
the flexible packaging material according to claim 9; and
an article packaged by the flexible packaging material.

11. The laminated product for flexible packaging according to claim 1,
wherein the basis weight of the paper constituting the paper substrate layer is 20 to 80 g/m$^2$.

* * * * *